US00RE35088E

United States Patent [19]

Gilbert

[11] E Patent Number: Re. 35,088

[45] Reissued Date of Patent: Nov. 14, 1995

[54] TRENCHING MACHINE WITH LATERALLY ADJUSTABLE CHAIN-TYPE DIGGING IMPLEMENT

[75] Inventor: Jerry F. Gilbert, Southlake, Tex.

[73] Assignee: Trencor Jetco, Inc., Grand Prairie, Tex.

[21] Appl. No.: 106,151

[22] Filed: Jul. 23, 1993

Related U.S. Patent Documents

Reissue of:

[64] Patent No.: 5,070,632
Issued: Dec. 10, 1991
Appl. No.: 697,137
Filed: May 8, 1991

[51] Int. Cl.[6] ..... E02F 3/12

[52] U.S. Cl. ..... 37/360; 37/352

[58] Field of Search ..... 37/360, 347, 353, 37/355, 356, 357, 361, 362, 104, 462, 464, 465, 189, 190, 352; 198/312, 315

[56] References Cited

U.S. PATENT DOCUMENTS

| | | | |
|---|---|---|---|
| 906,655 | 12/1908 | Parsons . | |
| 1,210,453 | 1/1917 | French . | |
| 3,043,035 | 7/1962 | Fogelberg | 37/190 |
| 3,044,194 | 7/1962 | Balkheimer . | |
| 3,107,444 | 10/1963 | Crum et al. . | |
| 3,117,685 | 1/1964 | Davis . | |
| 3,139,199 | 6/1964 | Auwelaer . | |
| 3,276,603 | 10/1966 | Noller . | |
| 3,307,276 | 3/1967 | Russell | 37/360 |
| 3,371,435 | 3/1968 | Miller . | |
| 3,412,881 | 11/1968 | Magee . | |
| 3,659,364 | 5/1972 | Wilson . | |
| 3,896,571 | 7/1975 | Satterwhite | 37/190 |
| 3,982,340 | 9/1976 | Satterwhite | 37/190 |
| 3,991,494 | 11/1976 | Schuermann et al. | 37/360 |
| 3,993,206 | 11/1976 | Jomen et al. . | |
| 3,994,083 | 11/1976 | Cunningham . | |
| 4,003,148 | 1/1977 | Satterwhite | 37/190 |
| 4,020,745 | 5/1977 | Iijima et al. . | |
| 4,095,358 | 6/1978 | Courson et al. | 37/360 |
| 4,157,623 | 6/1979 | Satterwhite | 37/190 |
| 4,167,826 | 9/1979 | Feliz | 37/190 |
| 4,171,582 | 10/1979 | Morooka | 37/360 |
| 4,183,711 | 1/1980 | Schaeff . | |
| 4,432,584 | 2/1984 | Vartanov et al. | 37/360 X |
| 4,459,767 | 7/1984 | Cartner | 37/362 |
| 4,833,797 | 5/1989 | Slunecka et al. . | |
| 4,941,786 | 7/1990 | Steinbock . | |
| 4,981,396 | 1/1991 | Albertson et al. | 37/357 X |
| 5,092,657 | 3/1992 | Bryan, Jr. | 37/189 |
| 5,219,380 | 6/1993 | Young et al. | 198/315 |
| 5,228,220 | 7/1993 | Bryan, Jr. | 37/360 |

OTHER PUBLICATIONS

"VERMEER" Xerox copies (comprised of several sales brochures containing 30 pages), provided by the firm of Davis, Hockenburg, Wine, Brown, Koehn & Shors, P.C., of Des Moines, Iowa. Phone (515) 288–2500.

*Primary Examiner*—Dennis L. Taylor
*Assistant Examiner*—Spencer Warnick
*Attorney, Agent, or Firm*—Nilles & Nilles

[57] ABSTRACT

A trenching machine has an elongated chain type digging implement that is pivotally mounted for vertical adjustment and movably mounted to a main frame thereof for lateral adjustment. The pivot coincides with the power shaft, and the elongated chain type digging implement is supported so it can be moved laterally in order to position the digging implement adjacent either side of the digging machine main frame and anywhere therebetween to excavate closely adjacent to buildings and other structures. The mechanism for moving the digging implement can be manually actuated by a hand crank arrangement. The main frame of the machine can be tilted laterally to either side to align the digging implement to excavate a vertical ditch. The tilting of the machine also makes it easier to manually move the digging implement laterally.

20 Claims, 5 Drawing Sheets

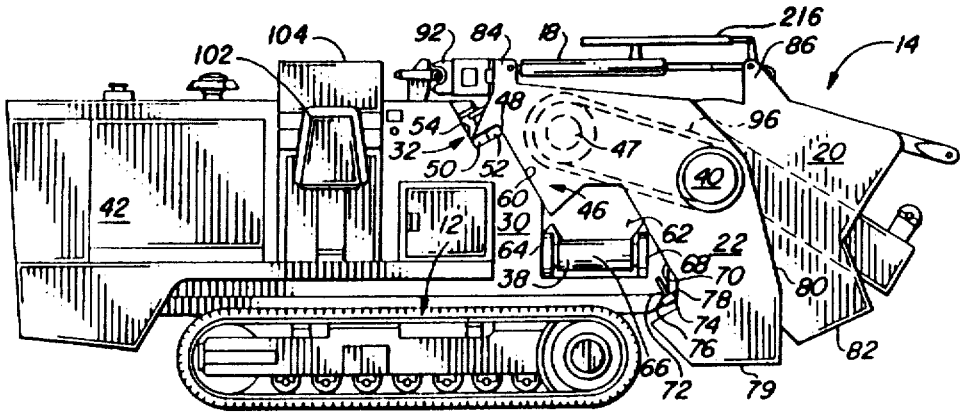
FIG. 4
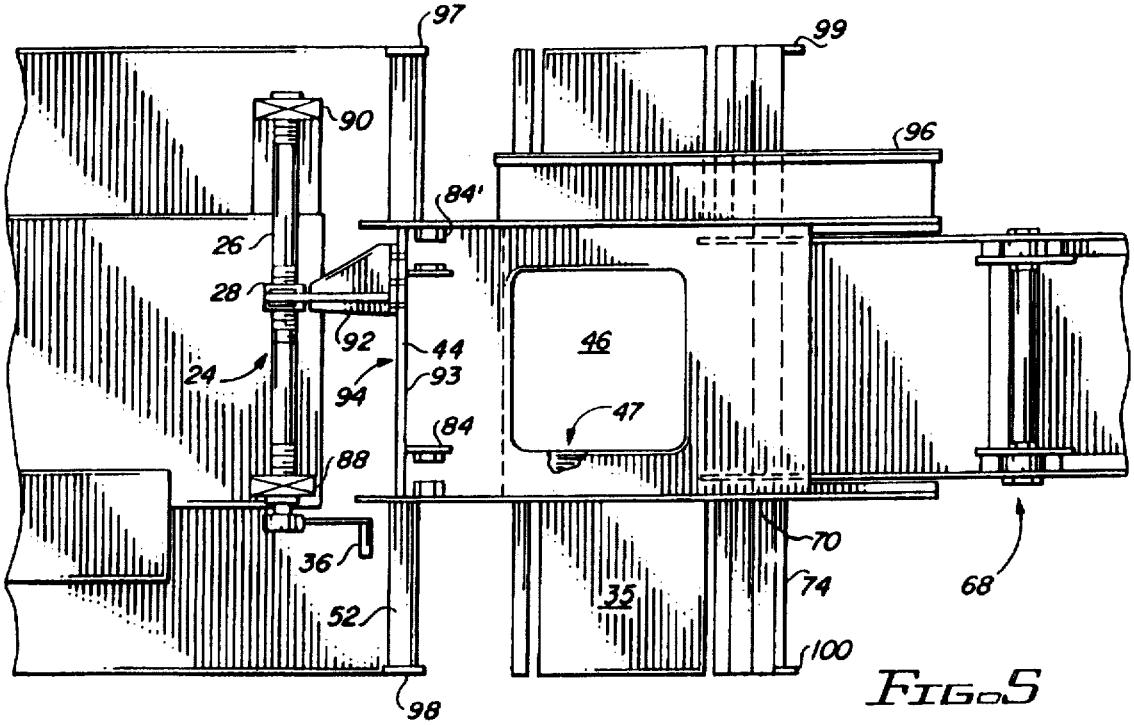
FIG. 5
FIG. 14
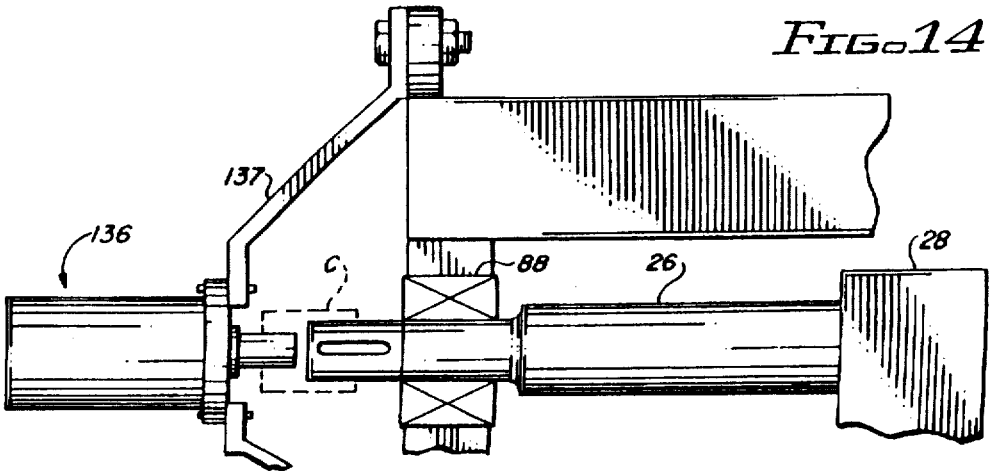

TRENCHING MACHINE WITH LATERALLY ADJUSTABLE CHAIN-TYPE DIGGING IMPLEMENT

Matter enclosed in heavy brackets [ ] appears in the original patent but forms no part of this reissue specification; matter printed in italics indicates the additions made by reissue.

BACKGROUND OF THE INVENTION

Numerous ditches are hand dug because adjacent obstructions, such as, for example, a building immediately adjacent the proposed ditch, precludes positioning an excavating machine close enough to the building to form the ditch along the projected line of construction. Often a proposed ditch will extend along the outer edge of a paved road, and for one reason or another it will not be possible for an excavating machine to travel with one side thereof on the pavement. In such an instance there is no solution to this problem other than using alternative excavating means, which usually entails manually digging the ditch.

Therefore, it is desirable to have made available an excavating machine having a digging implement thereon that is mounted for lateral adjustment respective to the main frame thereof, An excavating or trenching machine with such lateral adjustment capability would make it possible to form a proposed excavation longitudinally of the machine at a location anywhere within the range of lateral travel of the digging implement, which should include at least the width of the machine.

Accordingly, this disclosure comprehends a trenching or excavating machine having a digging implement that is pivotally mounted for vertical adjustment and movably mounted in a novel manner to the main frame thereof for lateral adjustment, such that the digging implement is supported to be moved laterally in order to position the digging implement adjacent either side of the trenching machine to thereby excavate closely adjacent to buildings, roads and other structures.

SUMMARY OF THE INVENTION

This invention comprehends an excavating machine having a digging implement supported thereon that is mounted to a main frame thereof in a manner to provide for lateral adjustment of the digging implement such that an excavation can be formed longitudinally of the machine at a location anywhere within a range of travel that at least includes a generous portion of the width of the machine.

More specifically, this disclosure comprehends a trenching machine having a track mounted chassis to which there is mounted a main frame. One end of the main frame supports an elongated chain-type digging implement. The digging implement is pivotally mounted for vertical adjustment and movably mounted for lateral adjustment respective to the main frame. The pivot coincides with a power shaft for the digging implement which is supported such that the digging implement can be moved laterally respective to the main frame in order to position the digging implement adjacent either side of the trenching machine main frame to thereby excavate closely adjacent to buildings and other structures.

This invention further comprehends a vehicle of the excavating type having provisions by which various earth moving implements can be mounted thereon to thereby enable one implement, such as for example, a digging implement, to be substituted for a different type earth moving implement.

Therefore, a primary object of this invention is to disclose and provide an excavating machine having a digging implement mounted thereon that is attached to the main frame thereof in a manner for lateral adjustment such that the excavation can be formed longitudinally of the machine at a location anywhere within a range of lateral travel that at least includes part of the width of the machine.

A further object of the present invention is the provision of an earth moving vehicle having attachments thereon by which one type excavating apparatus can be substituted for another.

Another object of the present invention is to provide an improved vehicle of the excavating type having provisions by which various earth moving implements can be mounted thereon to thereby enable one implement, such as for example a ladder type trenching apparatus to be substituted for another implement, such as for example, a wheel type trenching apparatus.

A still further object of this invention is to provide improvements in an excavating machine of the type having a trenching implement mounted respective to a main frame thereof in a manner to provide for lateral adjustment therebetween such that a proposed excavation can be formed longitudinally of the machine at a location respective to the machine that is within a range of lateral travel provided between the excavating machine and the brenching implement.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 4 is an enlarged side view of the excavating machine disclosed in FIG. 1, with some parts being removed therefrom to conserve space;

FIG. 5 is an enlarged, broken, top plan view of the excavating machine disclosed in FIGS. 1 and 4;

DETAILED DESCRIPTION OF THE PREFERRED EMBODIMENT

Figure 1:
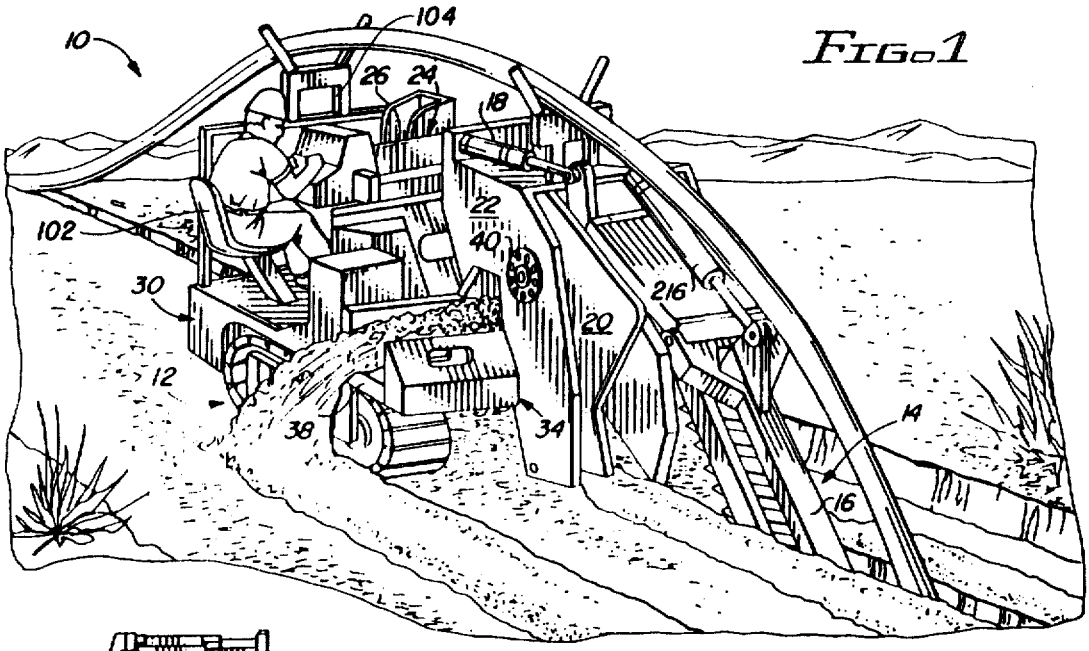
FIG. 1 is a perspective view of the preferred embodiment of an excavating or trenching machine made in accordance with this invention, shown in operation while excavating a ditch.
Figure 2:
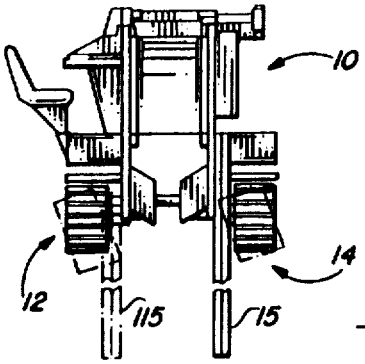
FIG. 2 is a reduced scale showing an end view of the excavating machine disclosed in FIG. 1.

This disclosure broadly comprehends an excavating machine having a laterally adjustable digging implement pivotally mounted thereon. The digging implement is pivotally mounted for vertical adjustment respective to a main frame thereof and is movably mounted for lateral adjustment respective to the main frame thereof.

The pivot of the digging implement coincides with the digging implement power shaft and is supported such that the digging implement can be moved laterally in order to position the digging implement adjacent either side of the trenching machine main frame to thereby excavate closely adjacent to buildings and other structures.

In the figures of the drawings, and in particular FIGS. 1–5, the arrow at numeral 10 indicates the preferred embodiment of a trenching machine, made in accordance with this invention. The trenching machine 10 includes a chassis 12 that is track mounted and supports an endless chain-type digging implement 14 having a continuous digging apparatus 15 associated therewith. A support shoe assembly 16 has a shoe 116 at the free end thereof. The support shoe assembly 16 is pivotally mounted for movement in a vertical plane to gauge the depth of the ditch. Hydraulically actuated cylinders *216* pivotally extend and retract the shoe 116.

As best seen in FIGS. [3 and 7,] *1, 3 and 4* the shoe 116 and chain-type digging implement 14 are concurrently pivotally moved vertically by the illustrated pair of hydraulic cylinders 18, 18' which are connected between the superstructure 84 of the support structure 22 and the superstructure 86 of [the] *a* mount means *or device* 20. [The] *A* laterally movable support structure 22 is mounted for lateral movement respective to main frame 30. The mount means 20 is pivotally mounted to the support structure 22 by shaft 40. Hence, lateral movement of support structure 22 respective to main frame 30 moves the mount means 20 laterally to thereby position the digging implement 14 and shoe 116 at either side of the main frame and at any selected lateral position within its range of operation.

Figure 3:
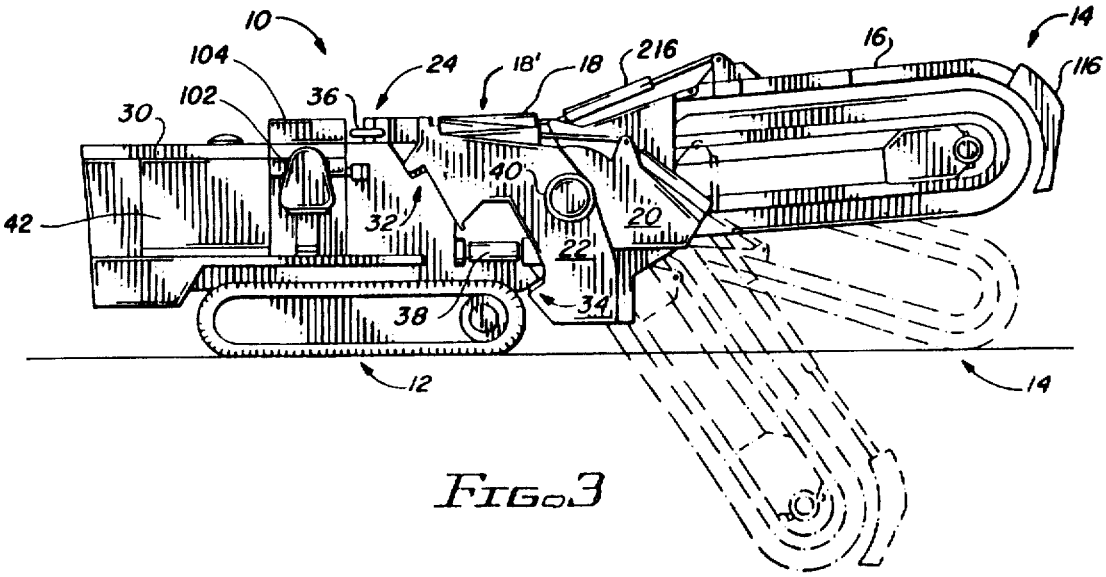
FIG. 3 is a side elevational view of the excavating machine disclosed in FIG. 1.

In FIGS. 3 and 5, numeral 24 indicates positioning apparatus by which the laterally movable support structure 22 is forced to move laterally respective to the main frame 30, and includes an elongated all-thread 26 rotatably journaled at opposed ends thereof to the main frame and is threadedly mated to a traveling nut 28. The traveling nut 28 is attached to move the support structure 22. Rotation of the all-thread 26 therefore laterally moves support structure 22 to thereby laterally position the digging implement anywhere within the range of travel afforded by the apparatus.

In [FIG. 3] *FIGS. 3 and 5* numeral 30 indicates the vehicle body and main frame which is mounted to tilt respective to the chassis 12 and thereby remains in a horizontal position while digging. Upper rail assembly 32 is affixed between one end of the main frame 30 and support structure 22. Stop means 97, 98 at opposed terminal ends of the rail assembly 32 limits lateral movement of the support structure 22. Lower rail assembly 34 similarly has stop means 99, 100 at each extremity thereof. Upper rail assembly 32 and lower rail assembly 34 are parallel to one another and arranged perpendicular to the longitudinal axis of the main frame. The upper rail assembly 32 and lower rail assembly 34 are spaced widely apart, as shown, for providing a large moment arm that suitably carries the load presented by mount means 20 and support structure 22, along with digging implement 14 and shoe 116.

As seen in FIGS. 4 and 10–13, the upper and lower rail assemblies include journal means and guide means that are arranged *on* respective [mount means 20 and] support structure 22 *and main frame 30* to engage and capture the support structure in low friction relationship to the main frame as will be more fully discussed later on.

As shown in FIG. 5, crank 36 is attached to one end of the all-thread 26. The crank 36 is manually rotated to selectively position the digging implement laterally in relation to the main frame. As illustrated in FIG. 14, powered means, such as an electric or hydraulic motor 136, can be used in lieu of the manual crank, if desired.

As shown in FIGS. [2] *3* and 4, a conveyor 38 underlies the discharge of the digging implement and conveys the excavated material away from the trenching machine as the ditch is being dug.

Pivot shaft 40 of FIGS. 1, 3 and 4 illustrates the end of a power shaft which pivotally connects together mount means 20 and support structure 22, and also provides means for supporting and operating the conveyor type digging implement. This system, along with a tilting mechanism that tilts the entire main frame in relation to the tracks in order to keep the main frame level while digging, provides the necessary control for the formation of a well constructed ditch.

Figure 7:
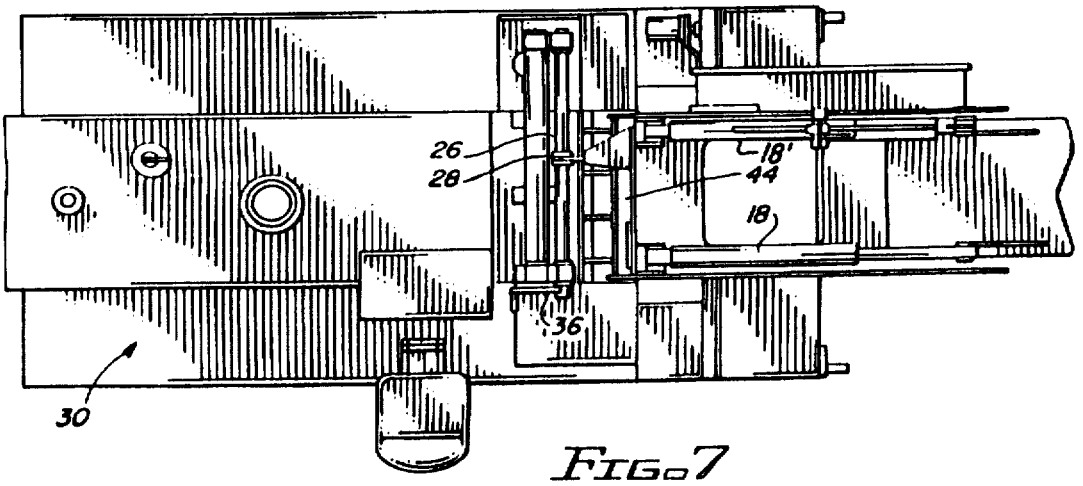
FIG. 7 is a broken, top plan view of the excavating machine disclosed in the foregoing figures.

There is a large diesel engine in compartment 42 [(FIG. 3)] *(FIGS. 3 and 4)* that provides hydraulic power for the trenching machine 10. Hydraulic hoses extend through a slot 44 (FIGS. 5 and 7) formed in an end wall or bulkhead of the compartment 46 *of support structure 22* and delivers power fluid to a hydraulic motor 47 (see FIGS. 4 and 5). The slot accommodates the lateral shifting of the hose as the support structure 22 moves respective to the main frame 30.

As shown in FIG. 4, *upper* journal means 48 are located within the space 50 that is formed between the support structure 22 and the main frame 30. The space 50 *also* accommodates the upper [rail assembly 32, and includes] guide means in the form of an upper guide rail 52 rigidly attached to a laterally extending step 54. Upper guide rail 52 and step 54 extends perpendicular to the longitudinal axis of the trenching machine 10 which *axis* is parallel to the tracks and to the normal path of travel. The rail is captured by a journal means *48* that includes a roller assembly, the details of which are set forth in FIGS. 10 and 11.

Figure 10:
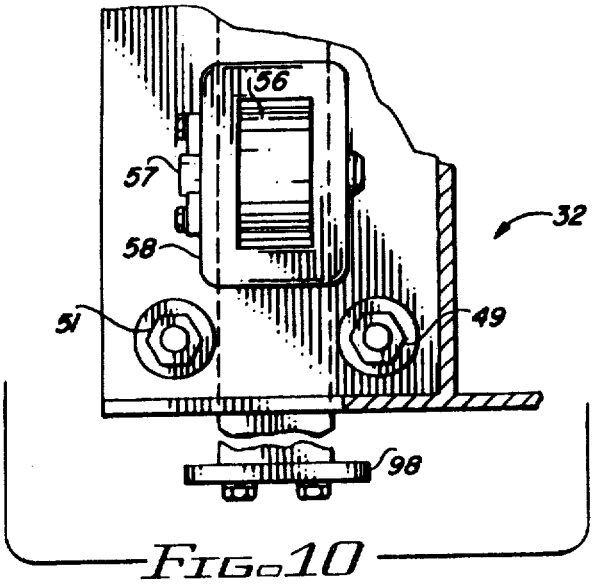
FIG. 10 is enlarged, fragmentary, detailed top view of part of the excavating machine disclosed in FIGS. 3, 4, and 9.
Figure 11:
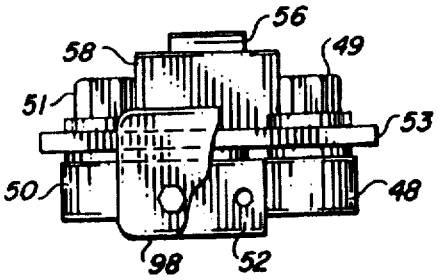
FIG. 11 is an enlarged, fragmentary, detailed side view of part of the apparatus disclosed in FIG. 10.

FIGS. 10 and 11 disclose the details of the journal means [48] that forms part of the upper rail assembly 32, and by which the support structure 22 is attached to the main frame *30*. The journal means includes rollers [148,150] *48, 50* and 56. Roller 56 has a shaft 57 supported from a cage 58 which in turn is supported from *a* structural member 53 of support structure 22. The roller 56 is positioned to ride the upper surface of upper guide rail 52. The rollers [148 and 150] *48 and 50* are attached to spaced shafts that are bolted at 49 and 51 to structural member 53. There are a plurality of spaced roller assemblies, [as seen] *only one of which is illustrated* in [FIG. 10] *FIGS. 10 and 11* spaced along upper guide rail 52.

In FIG. 4, angled end wall 60 of the main frame 30 forms a bulkhead that is spaced from the illustrated confronting end wall *or bulkhead* of the support structure 22. The wall structure is then turned vertically downward and forms part of a conveyor opening 62. Members 64 and 68 support opposed sides of a conveyor 38 while numeral 66 indicates a discharge end of conveyor 38.

[Sloped wall 70 of the support structure 22 is a] i A cutout [that] *70 is formed in the rear end wall or bulkhead of the support structure 22,* forms another part of the conveyor opening [62 and] *62,* extends down into proximity of the lower rail assembly 34, [ which] *and* includes a mounting surface 72 that supports a lower guide rail 74. The lower guide rail 74 is attached to the main frame *30* while a plurality of roller assemblies, the details of which are set forth in FIGS. 12 and 13, are captured in low friction relationship respective to the lower guide rail 74 and provides a low friction journal means for effecting lateral movement of the support structure 22.

Figure 12:
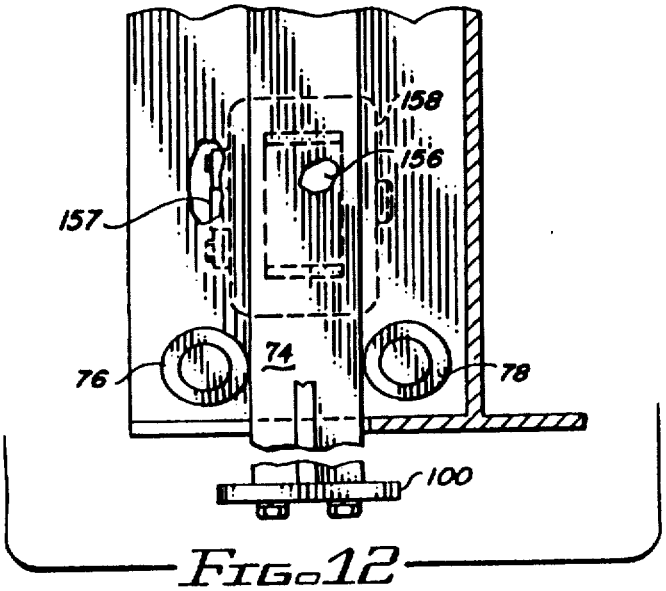
FIG. 12 is an enlarged, fragmentary, detailed top view of part of the excavating machine disclosed in FIGS. 3 and 4.
Figure 13:
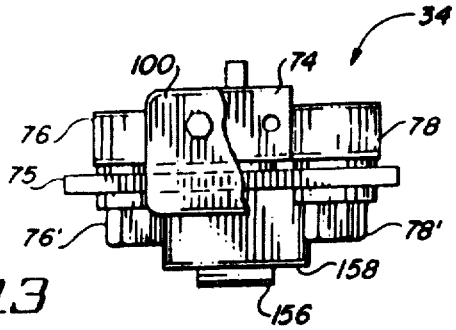
FIG. 13 is an enlarged, fragmentary, detailed side view of part of the apparatus disclosed in FIG. 12; and, FIG. 14 is an enlarged, fragmentary, detailed side view of part of a modification for the excavating machine of this invention.

*FIGS. 12 and 13 disclose the details of the journal means that form part of the lower rail assembly 34.* In FIGS. 12 and 13, plate member 75 supports a plurality of sets of rollers. One set of rollers is seen at 76, 78 with the lower guide rail 74 being located therebetween and making rolling contact therewith. The rollers 76, 78 have a shaft 76', 78' bolted to plate member 75. Roller 156 is arranged perpendicularly respective rollers 76, 78 to make rolling contact against the lower face of the lower guide rail 74 and is attached to plate member 75 by means of cage 158 in the same manner of roller 56 of FIGS. 10 and 11.

The support structure 22 *(FIG. 4)* continues downwardly from the lower step to a lower edge 79, and then turns upward to form the edge 80 adjacent the mount means 20. The mount means 20 has a lower edge 82. Superstructure 84 forms the upper part of support structure 22 and is spaced from superstructure 86 located on mount means 20, with the hydraulic cylinders 18, 18' (FIG. 7) being located therebetween for pivoting mount means 20 about shaft 40 in response to the reciprocating action of hydraulic cylinders 18, 18'.

Figure 8:
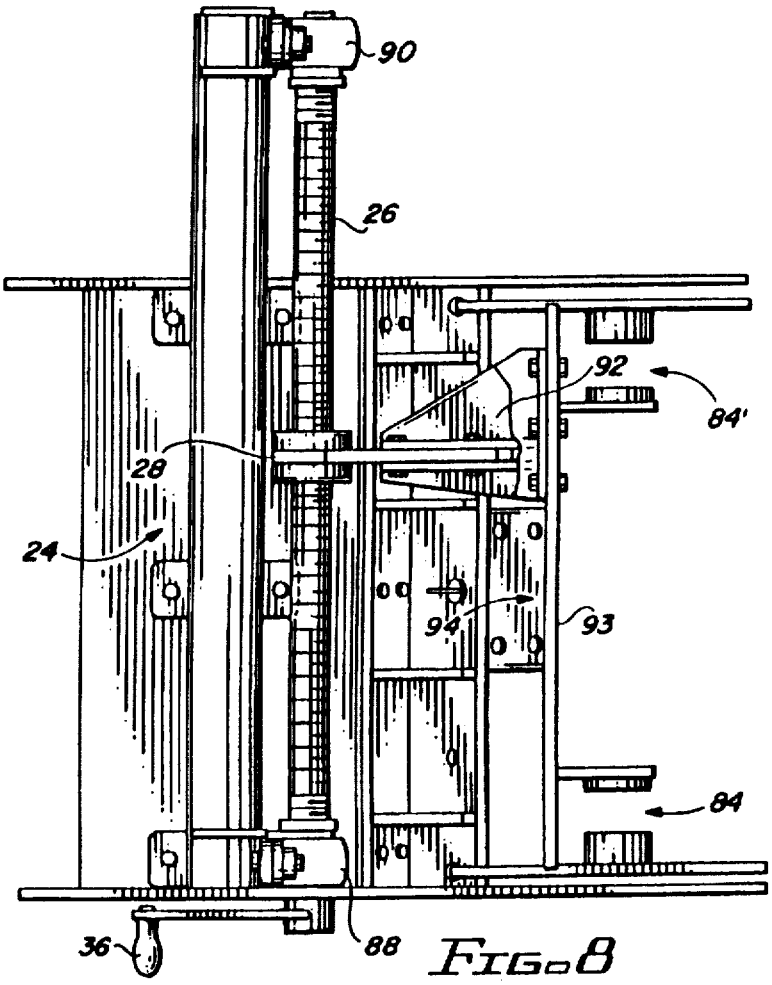
FIG. 8 is an enlarged, fragmentary, detailed top view of part of the excavating machine disclosed in FIGS. 5 and 7.

In FIGS. 5 and 8, the before mentioned all-thread 26 has the opposed ends thereof journaled to the main frame by suitable bearings 88 and 90. Traveling nut 28 is secured to transfer member 92 which in turn is secured to the illustrated superstructure of the support structure 22. The superstructure at 84, 84' pivotally receives one end of the hydraulic cylinders 18, 18'. The arrow at numeral 94 indicates the before mentioned slot 44 which forms an elongated opening that extends from compartment 46 of the support structure 22 and through the bulkhead 93 of the main frame. Hydraulic hoses can extend through slot 44 as noted by numeral 94. Numeral 96 indicates a chain drive housing by which hydraulic motor 47 (FIG. [4] *5*) drives the before mentioned power shaft that forms pivot 40 which in turn drives the chain type digging implement 14. Numerals 97, 98, 99 and 100 are stop members removably placed on the terminal ends of the upper rail assembly 32 and lower rail assembly 34.

Figure 6A:
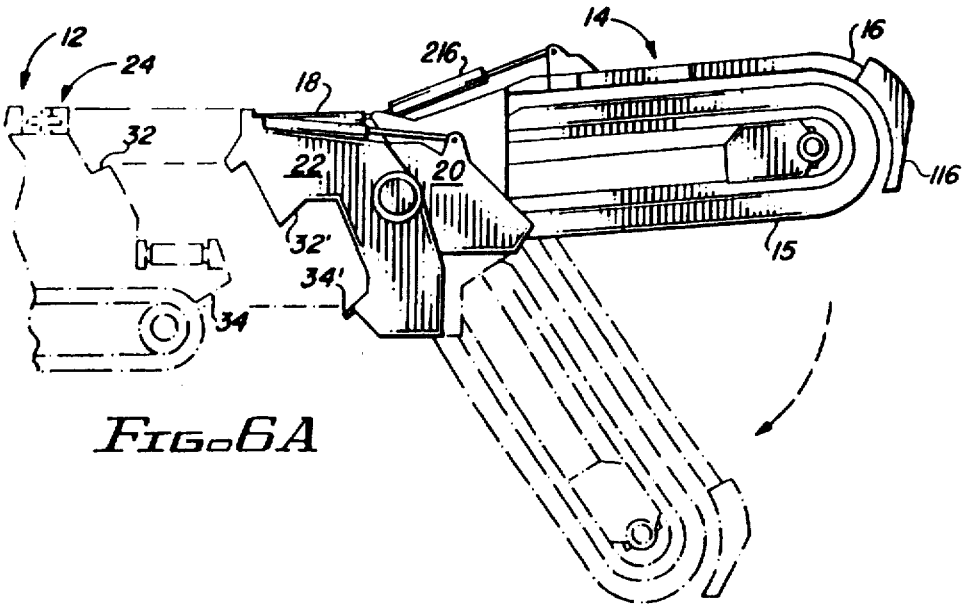
FIGS. 6A, 6B, and 6C are side elevational views that illustrate different digging implements that can be selected for attachment to the apparatus set forth in the foregoing figures.
Figure 6B:
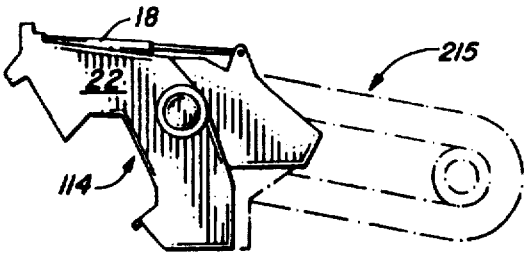
Figure 6C:
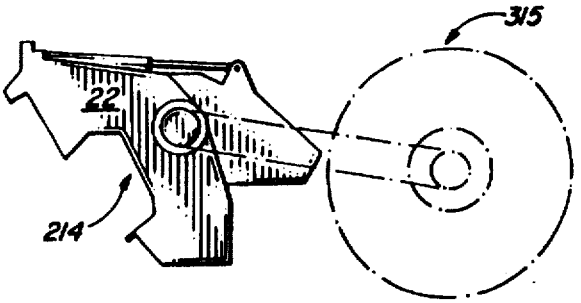

In FIG. 6A, it will be noted that the digging implement 14, shoe support assembly 16, mount means 20, and support structure 22 can be removed as a unit from the main frame 30 of the trenching machine by separating the two parts at the rail [assembly] *assemblies 32 and 34*. This is achieved by disconnecting the hydraulic hoses (not shown), removing the stop means at the end of the guide rails, and removing the digging implement 14 laterally from the main frame 30 of trenching machine 10. After removing the digging implement 14 from the main frame 30, in the manner of FIG. 6A, other digging implements 114 and 214 having various configurations, as seen at 215 and 315 in FIGS. 6B and 6C, can be substituted, therefor by reversing the above detailed procedure.

In FIG. 14, a hydraulic motor 136 having *a* brace 137 has been substituted for manual crank 36 *of FIG. 5* and drives all-thread 26 in either direction of rotation. As shown in FIGS. 1, 3 and 4, the operator is seated in a side position in seat 102 to provide good visibility both front and rear. All controls and operational gauges are conveniently grouped at the operator's station 104 for safe, positive and efficient operation. Located at this station are diagnostic ports to snap in gauges to check all hydraulic functions.

Figure 9:
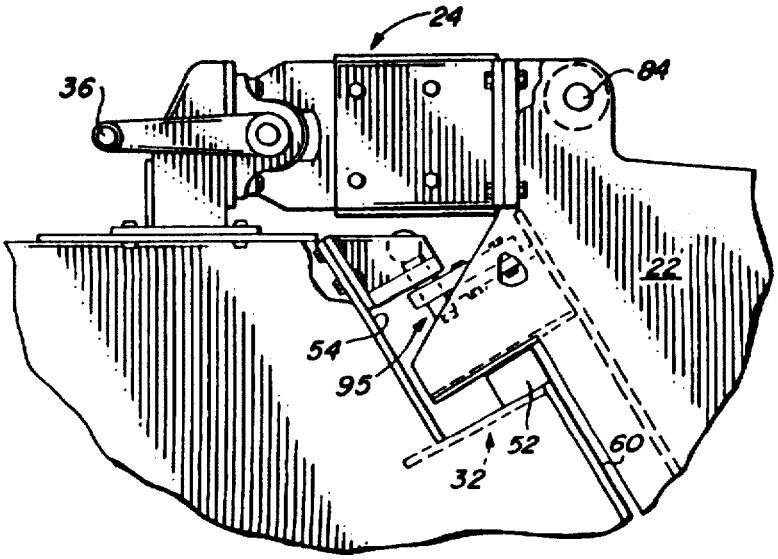
FIG. 9 is an enlarged, isolated, fragmented, detailed, side view of part of the excavating machine disclosed in FIG. 8.

In operation, the tracks of the excavating machine of this invention are placed closely adjacent to an obstruction and the digging implement 14 is moved laterally respective to the main frame by rotating crank 36 in the appropriate direction to position the ditch at the desired location respective to the obstruction. This job is made effortless by tilting the main frame in the appropriate direct, so that the support structure 22 gravitates down the inclined upper and lower guide rails. In FIG. 9, the laterally movable positioning apparatus 24 is next locked into the selected position by placing pin 95 in the appropriate one of a series of apertures before beginning the trenching operation. This locks the support structure 22 to the main frame 30. The main frame is automatically leveled while digging, so the ditch is excavated along a vertical plane.

The depth of the ditch is controlled by positioning the support shoe assembly 6 in the desired position by operation of the hydraulic cylinder 216.

The mount means 20 is pivoted by the twin hydraulic cylinders 18, 18' to concurrently raise or lower the digging implement and shoe assembly. A single hydraulic cylinder *216* is employed for [actuating] *pivoting* the shoe assembly 16 and is located equidistant between and parallel to the two spaced apart cylinders 18, 18'.

I claim:

1. An excavating machine [including] *comprising:*

*a chassis;* a main frame mounted [for pivotal movement to a] *to said* chassis, *said main frame having a longitudinal axis;* a digging implement arranged [along a longitudinal axis of the main frame and is removably mounted to said] *to dig along a line parallel to the longitudinal axis of the* main frame [in a manner for effecting lateral movement therebetween so that];

*a mount means for supporting said digging implement;*

*a support structure on which said mount means is mounted for lateral and vertical movement respective to said main frame, whereby* the digging implement is arranged for excavating longitudinally of the machine at a location selected within a range of lateral movement movement that [at least] includes a [a generous] *at least a* portion of the width of the machine;

upper and lower guide means attached in spaced relationship to said main frame, *wherein* said guide means extend perpendicular respective to the longitudinal axis of the [machine] *main frame* and are arranged in parallel relationship respective to one another [;] ,

*wherein an angled end wall on said main frame extends from the upper guide means down towards the lower guide means and is interrupted by a conveyor opening having opposed walls and being positioned longitudinally between said upper and lower guide means;*

[a support structure has] upper and lower journal means by which said support structure is supported from said main frame and by which said suppport structure is connected for low friction slidable lateral movement respective to said upper and lower guide means;

*wherein said support structure has a sloped wall that extends upwards from said lower guide means and defines one of said opposed walls of said conveyor opening, wherein said* mount means *is* pivotally supported *respective* to said support structure; *wherein* said digging implement *has a discharge end which* is supported by *said* mount means [which in turn are supported by said support structure] , *wherein a lateral conveyor is mounted within said conveyor opening and is arranged to receive excavated material from said discharge end*;

whereby; said upper and lower journal means [moves] *support* said digging implement, mount means, and support structure *for lateral movement* along said guide means to selectively position said digging implement laterally of the [chassis] *main frame.*

2. The excavating machine of claim 1 wherein the chassis is supported from a set of ground supported tracks, and the digging implement is a ladder type trencher having as power shaft that also forms [the] *a* pivot [for] *by which* said mount means *and said digging implement are pivotally supported on said support structure;* and *further comprising* a hydraulic motor *means,* mounted in said support structure, for actuating the digging implement.

3. [The excavating machine of claim 1] *An excavating machine comprising:*

*a chassis;*

*a main frame mounted for pivoted movement on said chassis, said main frame having a longitudinal axis;*

*a digging implement arranged along the longitudinal axis of the main frame, said digging implement being removably mounted to said main frame in a manner for effecting lateral movement therebetween so that the digging implement is arranged for excavating longitudinally of the machine at a location selected within a range of lateral movement that includes a generous portion of the width of the machine;*

*upper and lower guide means attached in spaced relationship to said main frame, wherein said guide means extend perpendicular respective to a longitudinal axis of the machine and are arranged in parallel relationship respective to one another;*

*a support structure which has upper and lower journal means by which said support structure is supported from said main frame and by which said support structure is connected for low friction slidable lateral movement respective to said upper and lower guide means;*

*mount means pivotally supported to said support structure; wherein said digging implement is supported by said mount means which in turn are supported by said support structure;*

*whereby, said upper and lower journal means move said digging implement, mount means, and support structure along said guide means to selectively position said digging implement laterally of the chassis,* wherein a hydraulic motor is mounted within said support structure for powering said digging implement; said main frame has a forward bulkhead on which said guide means is located, [a rear bulkhead on] said support structure *has a rear bulkhead* on which said upper and lower journal means is supported, and a lateral slot *is formed* in said forward bulkhead through which power fluid conduits extend for conveying power fluid to and from the hydraulic motor.

[4. The excavating machine of claim 1 wherein the chassis is track mounted for propelling the machine longitudinally along the ground, means for tilting the main frame respective to the chassis for vertical alignment of the digging implement, said support structure can be laterally moved respective to the main frame to remove the support structure, mount means and digging implement from the main frame so that another digging implement can be substituted therefor; manually actuated power means for forcing said support structure to move laterally respective to the main frame; whereby, said main frame can be tilted respective to the chassis to allow gravity to facilitate lateral movement of the support structure along the guide means.]

5. [The excavating machine of claim 1] *An excavating machine comprising:*

*a chassis;*

*a main frame mounted to said chassis, said main frame having a longitudinal axis;*

*a digging implement arranged to dig along parallel to the longitudinal axis of the main frame;*

*a mount means for supporting said digging implement;*

*a support structure on which said mount means is mounted for lateral and vertical movement respective to said main frame, whereby the digging implement is arranged for excavating longitudinally of the machine at a location selected within a range of lateral movement that includes at least a portion of the width of the machine;*

*upper and lower guide means attached in spaced relationship to said main frame, wherein said guide means extend perpendicular respective to the longitudinal axis of the main frame and are arranged in parallel relationship respective to one another; wherein an angled end wall on said main frame extends from the upper guide means down towards the lower guide means and is interrupted by a conveyor opening having opposed walls;*

*upper and lower journal means by which said support structure is supported from said main frame and by which said support structure is connected for low friction slidable lateral movement respective to said upper and lower guide means;*

*wherein said support structure has a sloped wall that extends upwards from said lower guide means and defines one of said opposed walls of said conveyor opening, wherein said mount means is pivotably supported respective to said support structure, wherein said digging implement has a discharge end which is supported by said mount means, wherein a lateral conveyor is mounted within said conveyor opening and is arranged to receive excavated material from said discharge end;*

*whereby; said upper and lower journal means support said digging implement, mount means, and support structure for lateral movement along said guide means to selectively position said digging implement laterally*

*of the main frame,* wherein the chassis is supported from a set of ground supported tracks, and the digging implement is a latter type trencher having a power shaft that also forms [the] *a* pivot betweens said support structure and said mount means; [said] *further comprising a* a hydraulic motor *which* is mounted within said support structure for powering said digging implement; *wherein* said main frame has a forward bulkhead on which said guide means is located, [a rear bulkhead on] said support structure *has a rear bulkhead* on which said upper and lower journal means is supported, and a lateral slot is formed in said rear bulkhead of said support structure through which power fluid conduits extend for conveying power fluid to and from the hydraulic motor.

[6. The excavating machine of claim 5 wherein the chassis is track mounted for propelling the machine longitudinally along the ground; means for tilting the main frame respective to the chassis for vertical alignment of the digging implement; said support structure can be laterally moved along said guide means and respective to the main frame to remove the support structure, mount means, and digging implement from the main frame so that another digging implement can be substituted therefor.]

7. An excavating machine [having] *comprising:* a main frame[;]*;* a ground supported chassis for supporting said main frame [, means by which said main frame can be tilted respective to said chassis];

means *for* propelling said chassis along the ground;

a digging implement[;] *having a discharge end;* a mount means for supporting said digging implement[,] *;* a support structure [by] *on* which *said mount means is pivotally supported; whereby* said digging implement and said mount means are pivotally mounted for vertical adjustment thereof respective to said main frame; *wherein said main frame has a forward bulkhead, and wherein said support structure has a rear bulkhead that confronts the main frame bulkhead;* a pair of *longitudinally spaced* parallel [guide means] *upper and lower rail assemblies,* mounted in spaced relationship [on] *between* said main frame[;] *bulkhead and* said support structure [has upper and lower journal means, respectively] *bulkhead* by which said support structure is supported from [the] *said* main frame [upper and lower guide means, respectively], and by which said support structure is slidably connected for low friction lateral movement respective to said [upper and lower guide means] *main frame, wherein a conveyor opening is formed betweens said main frame and said support structure, and longitudinally between said upper and lower rail assemblies;*

*a lateral conveyor supported on said main frame and located within the conveyor opening and below the discharge end of said digging implement, wherein* said mount means is pivotally supported respective to said support structure;

and means for forcing said digging implement, mount means, and support structure to move laterally along said [guide means] *upper and lower rail assemblies* to selectively position said digging implement laterally of the chassis.

[8. The excavating machine of claim 7 wherein the support structure has a rear bulkhead; the digging implement is driven by a hydraulic motor that drives a shaft aligned along the axis of the pivot by which said mount means and said support structure are pivotally connected; there is a motor driven hydraulic pump supported on the chassis that provides lower fluid from the pump to the hydraulic motor; power oil flow lines convey power fluid the bulkhead;

and manually actuated power means for moving said support structure laterally respective to the main frame; whereby, said main frame can be tilted respective to the chassis to allow gravity to facilitate lateral movement of the support structure.]

9. The machine of claim 7 wherein [the main frame tilts laterally respective to the chassis to enable a vertical ditch to be formed in the ground; the means by which said mount means is pivotally mounted to the] *said* support structure is *pivotally mounted on* power shaft for actuating the digging implement; whereby, the digging implement can be moved laterally to excavate closely adjacent to buildings and other structures; and can be adjusted to control the depth of a ditch and to align the digging implement vertically respective to a ditch.

[10. The machine of claim 7 wherein the guide means includes stops at each terminal end thereof and captures the journal means therebetween, said stops are removable to enable the digging implement to be removed from the main frame and another digging implement substituted therefor.]

11. The excavating machine of claim 7 wherein the chassis is supported from a set of ground supported tracks, and the digging implement is a ladder type trencher having power shaft that also forms [the] *a* pivot for said mount means and[,] *further comprising* a hydraulic motor mounted in said support structure for actuating the digging implement.

12. [The excavating machine of claim 7] *An excavating machine comprising:*

*a main frame;*

*a ground supported chassis for supporting said main frame;*

*means propelling said chassis along the ground;*

*a digging implement having a discharge end;*

*a mount means for supporting said digging implement;*

*a support structure on which said mount means is pivotally supported; whereby said digging implement and said mount means are pivotably mounted for vertical adjustment thereof respective to said main frame; wherein said main frame has a forward bulkhead, and wherein said support structure has a rearward bulkhead that confronts the main frame bulkhead;*

*a pair of longitudinally spaced parallel upper and lower rail assemblies, mounted in spaced relationship between said main frame bulkhead and said support structure bulkhead, by which said support structure is supported from said main frame, and by which said support structure is slidably connected for low friction lateral movement respective to said main frame, wherein a conveyor opening is formed between said main frame and said support structure, and longitudinally betweens said upper and lower rail assemblies;*

*a lateral conveyor supported on said main frame and located within the conveyor opening and below the discharge end of said digging implement, wherein said mount means is pivotally supported respective to said support structure;*

*and means for forcing said digging implement, mount means, and support structure to move laterally along said upper and lower rail assemblies to selectively*

*position said digging implement laterally of the chassis,* wherein a hydraulic motor is mounted within said support structure for powering said digging implement [; said main frame has a forward bulkhead on which], each of said rail assemblies includes guide means and journal means, said guide means are [located, a rear bulkhead on said support structure on which] *mounted on said main frame bulkhead and* said upper and lower journal means are supported on said support structure bulkhead, and a lateral slot *is formed* in said [rear] *support structure* bulkhead through which power fluid conduits extend for conveying power fluid to and from the hydraulic motor.

[13. The excavating machine of claim 7 wherein the chassis is track mounted for propelling the machine longitudinally along the ground; means tilting the main frame respective to the chassis for vertical alignment of the digging implement; said support structure can be laterally moved respective to the main frame to remove the support structure, mount means, and digging implement from the main frame so that another digging implement can be substituted therefor.]

14. An excavating machine [having] *comprising:* a chassis supported for movement along the ground[,], a main frame attached to said chassis, said main frame [has] *having* a bulkhead at one end thereof;

[means for tilting said main frame in a lateral direction respective to said chassis;]

a mount means;

a digging implement mounted to said mount means, *said digging implement having a discharge end;* an upper and a lower rail [system] *assembly;* a support structure [having] *on which said mount means is mounted and which has* a bulkhead at one end thereof *that confronts the main frame bulkhead,* said support structure [is] *being* attached for *lateral* movement respective to said main frame *bulkhead* by said upper and lower rail [system] *assemblies;*

[upper and lower journal means on said bulkhead of said support structure, said upper and lower journal means form part of said rail system; upper and lower guide means on said bulkhead of said main frame; said upper and lower guide means form part of said upper and lower rail system;]

*wherein* said upper and lower [guide means] *rail assemblies* are spaced apart *longitudinally* and arranged in parallel relationship respective to one another[, said upper and lower journal means of said support structure capture said guide means therewithin and thereby] *and* provide for lateral movement between said support structure and said main frame, *wherein a conveyor opening is formed between said main frame and said support structure, and longitudinally between the upper and lower rail assemblies;*

*a lateral conveyor, supported within the conveyor opening at a location below the discharge end of said digging implement, for receiving excavated material discharged from the digging implement;* whereby; said upper and lower rail [system] *assemblies* selectively [positions] *position* the support structure, mount means and digging implement laterally respective to the longitudinal axis of the main frame so that the location of an excavation [, such as a ditch,] respective to the *excavating* machine can be selected within the range of positions effected by movement of the support structure along the rail [system] *assemblies.*

[15. The excavating machine of claim 14 wherein the chassis is supported from a set of ground supported tracks, and the digging implement is a ladder type trencher having a power shaft that also forms the pivot for said mount means, and a hydraulic motor mounted in said support structure for actuating the digging implement.]

16. The excavating machine of claim 14 wherein a hydraulic motor is mounted within said support structure for powering said digging implement[;],

*each of said upper and lower rail assemblies comprise a guide means and a matching journal means,* the main frame bulkhead [on which] *supports* said guide means [are located,] and [the] said support structure bulkhead [on which] *supports* said [upper and lower] journal means,

[are supported,] move *laterally* respective to one another[;], a lateral slot *is formed* in said support structure bulkhead through which power fluid conduits extend for conveying power fluid to and from the hydraulic motor, and *further comprising* manually actuated crank means for moving said support structure laterally respective to the main frame[; whereby, said main frame can be tilted respective to the chassis to facilitate lateral movement of the support structure.]

17. The excavating machine of claim 14 wherein the chassis track mounted for propelling the machine longitudinally along the ground[; said means pivoting the main frame from the chassis provide for vertical alignment of the digging implement;], *and further comprising* stop means on said rail [system] *assemblies* that can be removed to allow said support structure to be laterally moved respective to the main frame to remove the support structure, mount means, and digging implement from the main frame so that another *support structure, mount means, and* digging implement can be substituted therefor.

[18. The excavating machine of claim 14 wherein the chassis is supported from a set of ground supported tracks, and the digging implement is a ladder type trencher having a power shaft that also forms the pivot for said mount means; said hydraulic motor is mounted within said support structure for powering said digging implement; and said main frame has a forward bulkhead on which said guide means is located, a rear bulkhead on said support structure on which said upper and lower journal means is supported, and a lateral slot in said rear bulkhead through which power fluid conduits extend for conveying power fluid to and from the hydraulic motor; and manually actuated positioning means for moving said support laterally respective to the main frame;

whereby, said main frame can be tilted respective to the chassis to allow gravity to facilitate lateral movement of the support structure.]

19. An excavating machine [has] *comprising:* a main frame[,], a chassis *which* supports the main frame [and includes means for tilting the main frame laterally respective to said chassis]; *a support structure mounted on said main frame;*

*a mount device pivotally supported structure via a pivot;* an elongated chain type digging implement [is pivotally] mounted *on and pivotable with said mount device* for vertical adjustment; [and is movably mounted respective to the main frame thereof for lateral adjustment, with]

*wherein* the pivot of the digging implement [coinciding] *and the mount device coincides* with a power shaft for powering the digging implement;

*and wherein* said digging implement *has a discharge end which* is supported from [a] *said* mount [means which is pivotally supported from a support structure;] *device, and further comprising longitudinally and vertically spaced upper and lower rail assemblies by which* said support structure is mounted to move laterally respective to the main frame [and includes means by which it can be moved laterally] in order to position the digging implement adjacent either side of the digging machine main frame and anywhere therebetween to excavate closely adjacent to buildings and other structures; [means by which the digging implement can be moved laterally respective the chassis of the machine,]

[whereby the machine can be tilted laterally to either side thereof to align the digging implement to excavate a vertical ditch and the tilting of the machine also makes it easier to laterally move the digging implement]

*wherein a conveyor opening is formed from facing cutouts in said mainframe and said support structure, and longitudinally between said upper and lower rail assemblies, and further comprising a lateral conveyor supported within the conveyor opening at a location below the digging implement discharge end for receiving excavating material discharged from said digging implement.*

[20. The excavating machine of claim 19 wherein the chassis is track mounted for propelling the machine longitudinally along the ground; means for tilting the main frame respective to the chassis for vertical alignment of the digging implement, said support structure can be laterally moved respective to the main frame to remove the support structure, mount means, and digging implement from the main frame so that another digging implement can be substituted therefor, manually actuated power means for moving said support structure laterally respective to the main frame, whereby, said main frame can be tilted respective to the chassis to facilitate lateral movement of the support structure.]

*21. An excavating machine comprising:*

*a chassis;*

*a main frame mounted on said chassis;*

*a support structure;*

*upper and lower longitudinally spaced rail assemblies connecting said support structure to said main frame and permitting said support structure to move laterally with respect to said main frame while preventing said support structure from pivoting longitudinally with respect to said main frame;*

*a digging implement which is pivotally supported on said support structure and which has a discharge end; and*

*a lateral conveyor which underlies said discharge end of said digging implement and which is disposed longitudinally between said upper and lower rail assemblies.*

*22. An excavating machine as defined in claim 21, wherein*

*said support structure includes a sloped rear bulkhead having a cutout formed therein,*

*said upper and lower rail assemblies are disposed proximate respective upper and lower ends of said sloped rear bulkhead, and*

*said lateral conveyor is disposed adjacent said cutout.*

*23. An excavating machine as defined in claim 21, wherein each of said upper and lower rail assemblies includes a guide rail and rollers which mate with said guide rail.*

*24. An excavating machine as defined in claim 23, wherein the guide rail of each of said rail assemblies is mounted on said main frame and the rollers of each of said rail assemblies are mounted on said support structure.*

*25. An excavating machine as defined in claim 22, wherein*

*said main frame includes a sloped front bulkhead which faces said sloped rear bulkhead of said support structure,*

*a cutout is formed in said main frame bulkhead and confronts said cutout in said support structure bulkhead to define a conveyor opening, and*

*said lateral conveyor is disposed in said conveyor opening.*

*26. An excavating machine as defined in claim 21, further comprising a mount device which is pivotally mounted on said support structure and on which is supported said digging implement.*

*27. An excavating machine comprising:*

*a chassis;*

*a main frame mounted on said chassis and having a front bulkhead;*

*a support structure having a rear bulkhead which faces said main frame front bulkhead, wherein facing cutouts are formed in said main frame front bulkhead and said support structure rear bulkhead and in combination define a conveyor opening;*

*a mount device pivotally mounted on said support structure;*

*a digging implement supported on said pivotable with respect to said support structure and having a discharge end;*

*upper and lower longitudinally and vertically spaced rail assemblies connecting said support structure rear bulkhead to said main frame front bulkhead and permitting said support structure to move laterally with respect to said main frame while preventing said support structure from pivoting longitudinally with respect to said main frame; and*

*a lateral conveyor which underlies asid discharge end of said digging implement and which is disposed in said conveyor opening longitudinally between said upper and lower rail assemblies.*

*28. An excavating machine as defined in claim 27, further comprising a mount device which is pivotally mounted on said support structure and on which is mounted said digging implement.*

* * * * *